US012354236B2

(12) United States Patent
Lee et al.

(10) Patent No.: US 12,354,236 B2
(45) Date of Patent: Jul. 8, 2025

(54) JOINT TRIMAP ESTIMATION AND ALPHA MATTE PREDICTION FOR VIDEO MATTING

(71) Applicant: Adobe Inc., San Jose, CA (US)

(72) Inventors: Joon-Young Lee, San Jose, CA (US); Seoungwug Oh, San Jose, CA (US); Brian Lynn Price, Pleasant Grove, UT (US); Hongje Seong, Seoul (KR)

(73) Assignee: Adobe Inc., San Jose, CA (US)

( * ) Notice: Subject to any disclaimer, the term of this patent is extended or adjusted under 35 U.S.C. 154(b) by 309 days.

(21) Appl. No.: 17/736,397

(22) Filed: May 4, 2022

(65) Prior Publication Data

US 2023/0360177 A1 Nov. 9, 2023

(51) Int. Cl.
*G06T 5/00* (2024.01)
*G06N 20/20* (2019.01)

(52) U.S. Cl.
CPC ............... *G06T 5/00* (2013.01); *G06N 20/20* (2019.01); *G06T 2207/10016* (2013.01); *G06T 2207/10024* (2013.01); *G06T 2207/20081* (2013.01)

(58) Field of Classification Search
CPC ............ G06T 5/00; G06T 2207/10016; G06T 2207/10024; G06T 2207/20081; G06N 20/20
See application file for complete search history.

(56) References Cited

U.S. PATENT DOCUMENTS

2018/0253865 A1* 9/2018 Price .................. G06N 3/084
2020/0311946 A1* 10/2020 Price .................. G06T 3/40

OTHER PUBLICATIONS

Seong, H., Oh, S. W., Price, B., Kim, E., & Lee, J. Y. (Oct. 2022). One-trimap video matting. In European Conference on Computer Vision (pp. 430-448). Cham: Springer Nature Switzerland. (Year: 2022).*
Cai, S., Zhang, X., Fan, H., Huang, H., Liu, J., Liu, J., . . . & Sun, J. (2019). Disentangled image matting. In Proceedings of the IEEE/CVF International Conference on Computer Vision (pp. 8819-8828). (Year: 2019).*
Apostoloff, Nicholas et al., "Bayesian video matting using learnt image priors", IEEE Computer Society Conference on Computer Vision and Pattern Recognition [retrieved Feb. 9, 2022]. Retrieved from the Internet <https://www.robots.ox.ac.uk/~vgg/publications/2004/Apostoloff04/apostoloff04.pdf>., 2004, 8 Pages.

(Continued)

*Primary Examiner* — David Perlman
(74) *Attorney, Agent, or Firm* — FIG. 1 Patents

(57) ABSTRACT

In implementations of systems for joint trimap estimation and alpha matte prediction, a computing device implements a matting system to estimate a trimap for a frame of a digital video using a first stage of a machine learning model. An alpha matte is predicted for the frame based on the trimap and the frame using a second stage of the machine learning model. The matting system generates a refined trimap and a refined alpha matte for the frame based on the alpha matte, the trimap, and the frame using a third stage of the machine learning model. An additional trimap is estimated for an additional frame of the digital video based on the refined trimap and the refined alpha matte using the first stage of the machine learning model.

20 Claims, 13 Drawing Sheets
(7 of 13 Drawing Sheet(s) Filed in Color)

(56) References Cited

OTHER PUBLICATIONS

Bai, Xue et al., "Towards Temporally-Coherent Video Matting", Proceedings of the 5th international conference on Computer vision/computer graphics collaboration techniques [retrieved Feb. 9, 2022]. Retrieved from the Internet <http://citeseerx.ist.psu.edu/viewdoc/download?doi=10.1.1.695.175&rep=rep1&type=pdf>., Oct. 10, 2011, 12 Pages.

Chen, Qifeng et al., "KNN Matting", IEEE Transactions on Pattern Analysis and Machine Intelligence [retrieved Feb. 9, 2022]. Retrieved from the Internet <https://cqf.io/papers/KNN_Matting_CVPR2012.pdf>., Jan. 11, 2013, 8 Pages.

Chen, Xiaowu et al., "Image Matting with Local and Nonlocal Smooth Priors", CVPR '13: Proceedings of the 2013 IEEE Conference on Computer Vision and Pattern Recognition [retrieved Feb. 10, 2022]. Retrieved from the Internet <https://citeseerx.ist.psu.edu/viewdoc/download?doi=10.1.1.676.2757&rep=rep1&type=pdf>., Jun. 23, 2013, 6 Pages.

Cheng, Ming-Ming et al., "Global Contrast based Salient Region Detection", IEEE Transactions on Pattern Analysis and Machine Intelligence [retrieved Feb. 10, 2022]. Retrieved from the Internet <http://citeseerx.ist.psu.edu/viewdoc/download?doi=10.1.1.228.5552&rep=rep1&type=pdf>., Mar. 2015, 9 Pages.

Cho, Donghyeon et al., "Natural Image Matting Using Deep Convolutional Neural Networks", European Conference on Computer Vision [retrieved Feb. 10, 2022]. Retrieved from the Internet <https://doi.org/10.1007/978-3-319-46475-6_39>., Sep. 17, 2016, 18 pages.

Choi, Inchang et al., "Video Matting Using Multi-frame Nonlocal Matting Laplacian", European Conference on Computer Vision Committee [retrieved Feb. 10, 2022]. Retrieved from the Internet <http://inchangchoi.info/resource/publications/eccv12_videomatting.pdf>., 2012, 14 Pages.

Chuang, Yung-Yu et al., "A Bayesian Approach to Digital Matting", Proceedings of IEEE CVPR [retrieved Feb. 10, 2022]. Retrieved from the Internet <https://www.cmlab.csie.ntu.edu.tw/new_cml_website/media/publications/Chuang-2001-BAD.pdf>., 2001, 8 pages.

Chuang, Yung-Yu et al., "Video Matting of Complex Scenes", Proc. of ACM SIGGRAPH [retrieved Feb. 10, 2022]. Retrieved from the Internet <https://web.tecgraf.puc-rio.br/~scuri/inf1378/pub/chuang.pdf>., Jul. 2002, 6 Pages.

Erofeev, Mikhail et al., "Perceptually Motivated Benchmark for Video Matting", Proceedings of the British Machine Vision Conference [retrieved Feb. 10, 2022]. Retrieved from the Internet <http://www.bmva.org/bmvc/2015/papers/paper099/paper099.pdf>., 2015, 12 Pages.

Everingham, Mark et al., "The PASCAL Visual Object Classes (VOC) Challenge", International journal of computer vision, vol. 88, No. 2 [retrieved Feb. 10, 2022]. Retrieved from the Internet <http://citeseerx.ist.psu.edu/viewdoc/download?doi=10.1.1.167.6629&rep=rep1&type=pdf>., Sep. 9, 2009, 34 pages.

Forte, Marco et al., "F, B, Alpha Matting", Cornell University arXiv, arXiv.org [retrieved Feb. 10, 2022]. Retrieved from the Internet <https://arxiv.org/pdf/2003.07711.pdf>., Mar. 17, 2020, 17 Pages.

Gastal, Eduardo S. et al., "Shared Sampling for Real-Time Alpha Matting", Computer Graphics Forum vol. 29, No. 2 [retrieved Feb. 10, 2022]. Retrieved from the Internet <https://www.inf.ufrgs.br/~eslgastal/SharedMatting/Gastal_Oliveira_EG2010_Shared_Matting.pdf>., Jun. 7, 2010, 10 pages.

Gong, Minglun et al., "Real-time video matting using multichannel poisson equations", GI '10: Proceedings of Graphics Interface [retrieved Feb. 10, 2022]. Retrieved from the Internet <https://citeseerx.ist.psu.edu/viewdoc/download?doi=10.1.1.228.1075&rep=rep1&type=pdf>., May 31, 2010, 8 Pages.

Grady, Leo et al., "Random Walks for Interactive Alpha-Matting", Proceedings of the Fifth IASTED International Conference on Visualization [retrieved Feb. 10, 2022]. Retrieved from the Internet <http://citeseerx.ist.psu.edu/viewdoc/download?doi=10.1.1.220.8725&rep=rep1&type=pdf>., 2005, 7 Pages.

Hariharan, Bharath et al., "Semantic Contours from Inverse Detectors", in Proceedings of the IEEE International Conference on Computer Vision [retrieved Feb. 10, 2022]. Retrieved from the Internet <https://media.gradebuddy.com/documents/1654309/00dc1fdb-dfd6-4852-a8c3-a41028b72370.pdf>., Nov. 2011, 8 pages.

He, Kaiming et al., "A Global Sampling Method for Alpha Matting", CVPR 2011 [retrieved Feb. 10, 2022]. Retrieved from the Internet <https://www.ims.tuwien.ac.at/projects/3d-tv/downloads/cvpr11matting.pdf>., 2011, 8 Pages.

He, Kaiming et al., "Deep Residual Learning for Image Recognition", Proceedings of the IEEE conference on computer vision and pattern recognition, 2016 [retrieved Feb. 18, 2022], Retrieved from the Internet: <https://openaccess.thecvf.com/content_cvpr_2016/papers/He_Deep_Residual_Learning_CVPR_2016_paper.pdf>., Jun. 2016, 12 pages.

Hou, Qiqi et al., "Context-Aware Image Matting for Simultaneous Foreground and Alpha Estimation", Cornell University arXiv, arXiv.org [retrieved Feb. 14, 2022]. Retrieved from the Internet <https://arxiv.org/pdf/1909.09725.pdf>., Oct. 2, 2019, 10 Pages.

Ke, Zhanghan et al., "MODNet: Real-Time Trimap-Free Portrait Matting via Objective Decomposition", Cornell University arXiv, arXiv.org [retrieved Feb. 14, 2022]. Retrieved from the Internet <https://arxiv.org/pdf/2011.11961.pdf>., Jan. 27, 2022, 13 Pages.

Kei Cheng, Ho et al., "Rethinking Space-Time Networks with Improved Memory Coverage for Efficient Video Object Segmentation", Cornell University arXiv, arXiv.org [retrieved Feb. 10, 2022]. Retrieved from the Internet <https://arxiv.org/pdf/2106.05210.pdf>., Oct. 8, 2021, 19 Pages.

Lee, Philip et al., "Nonlocal matting", CVPR '11: Proceedings of the 2011 IEEE Conference on Computer Vision and Pattern Recognition [retrieved Feb. 14, 2022]. Retrieved from the Internet <https://citeseerx.ist.psu.edu/viewdoc/download?doi=10.1.1.363.11&rep=rep1&type=pdf>., Jun. 20, 2011, 8 Pages.

Lee, Sun-Young et al., "Temporally Coherent Video Matting", Graphical Models vol. 72, No. 3 [retrieved Feb. 15, 2022]. Retrieved from the Internet <https://web.archive.org/web/20170705104504id_/http://visualcomputing.yonsei.ac.kr/papers/2010/matting.pdf>., 2010, 19 pages.

Levin, Anat et al., "A Closed-Form Solution to Natural Image Matting", IEEE Transactions on Pattern Analysis and Machine Intelligence, vol. 30, No. 2 [retrieved Feb. 14, 2022]. Retrieved from the Internet <https://www.cs.jhu.edu/~misha/ReadingSeminar/Papers/Levin06.pdf>., Feb. 2008, 15 pages.

Levin, Anat et al., "Spectral Matting", IEEE Conference on Computer Vision and Pattern Recognition [retrieved Feb. 14, 2022]. Retrieved from the Internet <http://citeseerx.ist.psu.edu/viewdoc/download?doi=10.1.1.438.5103&rep=rep1&type=pdf>., Oct. 2008, 14 pages.

Li, Dingzeyu et al., "Motion-Aware KNN Laplacian for Video Matting", IEEE International Conference on Computer Vision (ICCV) [retrieved Feb. 14, 2022]. Retrieved from the Internet <http://citeseerx.ist.psu.edu/viewdoc/download?doi=10.1.1.684.9175&rep=rep1&type=pdf>., 2013, 8 Pages.

Li, Yaoyi et al., "Natural Image Matting via Guided Contextual Attention", Proceedings of the AAAI Conference on Artificial Intelligence [retrieved Feb. 14, 2022]. Retrieved from the Internet <https://ojs.aaai.org/index.php/AAAI/article/view/6809>., Apr. 3, 2020, 8 Pages.

Lin, Shanchuan et al., "Real-Time High-Resolution Background Matting", Cornell University arXiv, arXiv.org [retrieved Feb. 14, 2022]. Retrieved from the Internet <https://arxiv.org/pdf/2012.07810.pdf>., Dec. 14, 2020, 16 Pages.

Lin, Shanchuan et al., "Robust High-Resolution Video Matting With Temporal Guidance", Cornell University arXiv, arXiv.org [retrieved Feb. 14, 2022]. Retrieved from the Internet <https://arxiv.org/pdf/2108.11515.pdf>., Aug. 25, 2021, 14 Pages.

Lin, Tsung-Yi et al., "Microsoft COCO: Common Objects in Context", Cornell University arXiv, arXiv.org [retrieved Feb. 14, 2022]. Retrieved from the Internet <https://arxiv.org/pdf/1405.0312.pdf>., Feb. 21, 2015, 15 Pages.

Liu, Liyuan et al., "On the Variance of the Adaptive Learning Rate and Beyond", Cornell University arXiv, arXiv.org [retrieved Feb.

(56) References Cited

OTHER PUBLICATIONS 14, 2022]. Retrieved from the Internet <https://arxiv.org/pdf/1908.03265.pdf>., Oct. 26, 2021, 14 Pages.

Lu, Hao et al., "Indices Matter: Learning to Index for Deep Image Matting", Cornell University arXiv, arXiv.org [retrieved Feb. 14, 2022]. Retrieved from the Internet <https://arxiv.org/pdf/1908.00672.pdf>., Aug. 2, 2019, 11 Pages.

Oh, Seoung Wug et al., "Video Object Segmentation Using Space-Time Memory Networks", Cornell University arXiv, arXiv.org [retrieved Feb. 14, 2022]. Retrieved from the Internet <https://arxiv.org/pdf/1904.00607.pdf>., Aug. 12, 2019, 10 Pages.

Pont-Tuset, Jordi et al., "The 2017 DAVIS Challenge on Video Object Segmentation", Cornell University arXiv, arXiv.org [retrieved Feb. 15, 2022]. Retrieved from the Internet <https://arxiv.org/pdf/1704.00675.pdf>., Mar. 1, 2018, 6 pages.

Porter, Thomas et al., "Compositing Digital Images", SIGGRAPH '84 Computer Graphics vol. 18, No. 3 [retrieved Feb. 15, 2022]. Retrieved from the Internet <https://keithp.com/~keithp/porterduff/p253-porter.pdf>., Jul. 1984, 7 Pages.

Russakovsky, Olga et al., "ImageNet Large Scale Visual Recognition Challenge", arXiv Preprint, arXiv.org [retrieved Feb. 15, 2021]. Retrieved from the Internet <https://arxiv.org/pdf/1409.0575.pdf>., Jan. 30, 2015, 43 pages.

Sengupta, Soumyadip et al., "Background Matting: The World Is Your Green Screen", Cornell University arXiv, arXiv.org [retrieved Feb. 15, 2022]. Retrieved from the Internet <https://arxiv.org/pdf/2004.00626.pdf>., Apr. 10, 2020, 16 Pages.

Seong, Hongje et al., "Hierarchical Memory Matching Network for Video Object Segmentation", Cornell University arXiv, arXiv.org [retrieved Feb. 15, 2022]. Retrieved from the Internet <https://arxiv.org/pdf/2109.11404.pdf>., Sep. 2021, 17 Pages.

Shahrian, E et al., "Temporally coherent and spatially accurate video matting", Computer Graphics Forum, vol. 33, No. 2 [retrieved May 13, 2022]. Retrieved from the Internet <https://doi.org/10.1111/cgf.12297>., Jun. 2014, 10 pages.

Shahrian, Ehsan et al., "Improving Image Matting Using Comprehensive Sampling Sets", Proceedings of the IEEE Conference on Computer Vision and Pattern Recognition (CVPR) [retrieved Feb. 15, 2022]. Retrieved from the Internet <https://web.bii.a-star.edu.sg/~zhangxw/files/Improving_Image_Matting.pdf>., 2013, 8 Pages.

Shen, Xiaoyong et al., "Deep Automatic Portrait Matting", European Conference on Computer Vision [retrieved Feb. 15, 2022]. Retrieved from the Internet <https://jiaya.me/projects/automatting/papers/deepmatting.pdf>., 2016, 16 Pages.

Shi, Jianping et al., "Hierarchical Image Saliency Detection on Extended CSSD", IEEE Transactions on Pattern Analysis and Machine Intelligence vol. 38, No. 4 [retrieved Feb. 15, 2022]. Retrieved from the Internet <https://arxiv.org/pdf/1408.5418.pdf>., Aug. 4, 2015, 14 Pages.

Sun, Jian et al., "Poisson Matting", Proceedings of ACM SIGGRAPH Transactions on Graphics (TOG), vol. 23 Issue 3 [retrieved Feb. 14, 2022]. Retrieved from the Internet <http://www.cs.cuhk.edu.hk/~leojia/all_final_papers/matting_siggraph04.pdf>., Aug. 2004, 7 Pages.

Sun, Jiayu et al., "MODNet-V: Improving Portrait Video Matting via Background Restoration", Cornell University arXiv, arXiv.org [retrieved Feb. 15, 2022]. Retrieved from the Internet <https://arxiv.org/pdf/2109.11818.pdf>., Sep. 24, 2021, 8 Pages.

Sun, Yanan et al., "Deep Video Matting via Spatio-Temporal Alignment and Aggregation", Cornell University arXiv, arXiv.org [retrieved Feb. 15, 2022]. Retrieved from the Internet <https://arxiv.org/pdf/2104.11208.pdf>., Apr. 22, 2021, 10 Pages.

Tang, Zhen et al., "Temporally consistent video matting based on bilayer segmentation", IEEE International Conference on Multimedia and Expo [retrieved May 13, 2022]. Retrieved from the Internet <https://doi.org/10.1109/ICME.2010.5583894>., Jul. 2010, 6 pages.

Tang, Zhen et al., "Video matting via opacity propagation", The Visual Computer: International Journal of Computer Graphics vol. 28 [retrieved May 13, 2022]. Retrieved from the Internet <https://doi.org/10.1007/s00371-011-0598-3>., Apr. 19, 2011, 15 pages.

Wang, Jue et al., "Optimized Color Sampling for Robust Matting", Proceedings of IEEE CVPR [retrieved Feb. 15, 2022]. Retrieved from the Internet <http://grail.cs.washington.edu/wp-content/uploads/2015/08/wang2007robust.pdf>., 2007, 8 pages.

Wang, Xintao et al., "EDVR: Video Restoration With Enhanced Deformable Convolutional Networks", Cornell University arXiv, arXiv.org [retrieved Feb. 15, 2022]. Retrieved from the Internet <https://arxiv.org/pdf/1905.02716.pdf>., May 7, 2019, 10 Pages.

Woo, Sanghyun et al., "CBAM: Convolutional Block Attention Module", Cornell University arXiv, arXiv.org [retrieved Feb. 15, 2022]. Retrieved from the Internet <https://arxiv.org/pdf/1807.06521.pdf>., Jul. 18, 2018, 17 Pages.

Xu, Ning et al., "Deep Image Matting", Computer Vision and Pattern Recognition (CVPR) [retrieved Feb. 15, 2022]. Retrieved from the Internet <https://web.archive.org/web/20181222155352id_/http://openaccess.thecvf.com:80/content_cvpr_2017/papers/Xu_Deep_Image_Matting_CVPR_2017_paper.pdf>., Apr. 11, 2017, 10 pages.

Xu, Ning et al., "YouTube-VOS: A Large-Scale Video Object Segmentation Benchmark", Cornell University arXiv, arXiv.org [retrieved Feb. 15, 2022]. Retrieved from the Internet <https://arxiv.org/pdf/1809.03327.pdf>., Sep. 6, 2018, 10 Pages.

Xu, Ning et al., "YouTube-VOS: Sequence-to-Sequence Video Object Segmentation", Cornell University arXiv, arXiv.org [retrieved Feb. 15, 2022]. Retrieved from the Internet <https://arxiv.org/pdf/1809.00461.pdf>., Sep. 3, 2018, 17 Pages.

Yu, Qihang et al., "Mask Guided Matting via Progressive Refinement Network", Cornell University arXiv, arXiv.org [retrieved Feb. 15, 2022]. Retrieved from the Internet <https://arxiv.org/pdf/2012.06722.pdf>., Apr. 2, 2021, 10 Pages.

Zhang, Yunke et al., "Attention-guided Temporally Coherent Video Object Matting", Cornell University arXiv, arXiv.org [retrieved Feb. 15, 2022]. Retrieved from the Internet <https://arxiv.org/pdf/2105.11427.pdf>., Jul. 29, 2021, 10 Pages.

Zhu, Bingke et al., "Fast Deep Matting for Portrait Animation on Mobile Phone", Cornell University arXiv, arXiv.org [retrieved Feb. 15, 2022]. Retrieved from the Internet <https://arxiv.org/pdf/1707.08289.pdf>., Jul. 26, 2017, 9 Pages.

\* cited by examiner

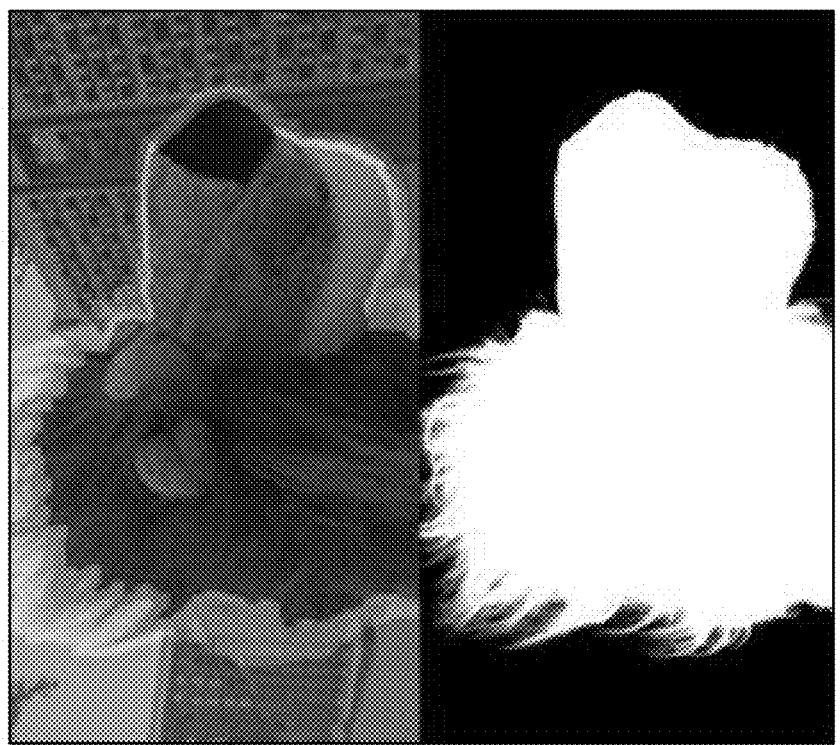
Fig. 3A

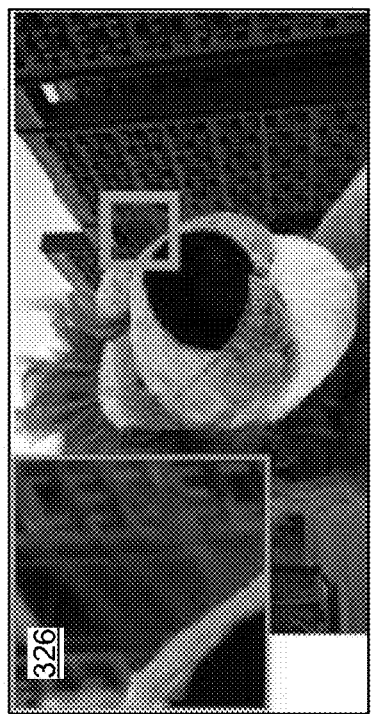
Fig. 3B

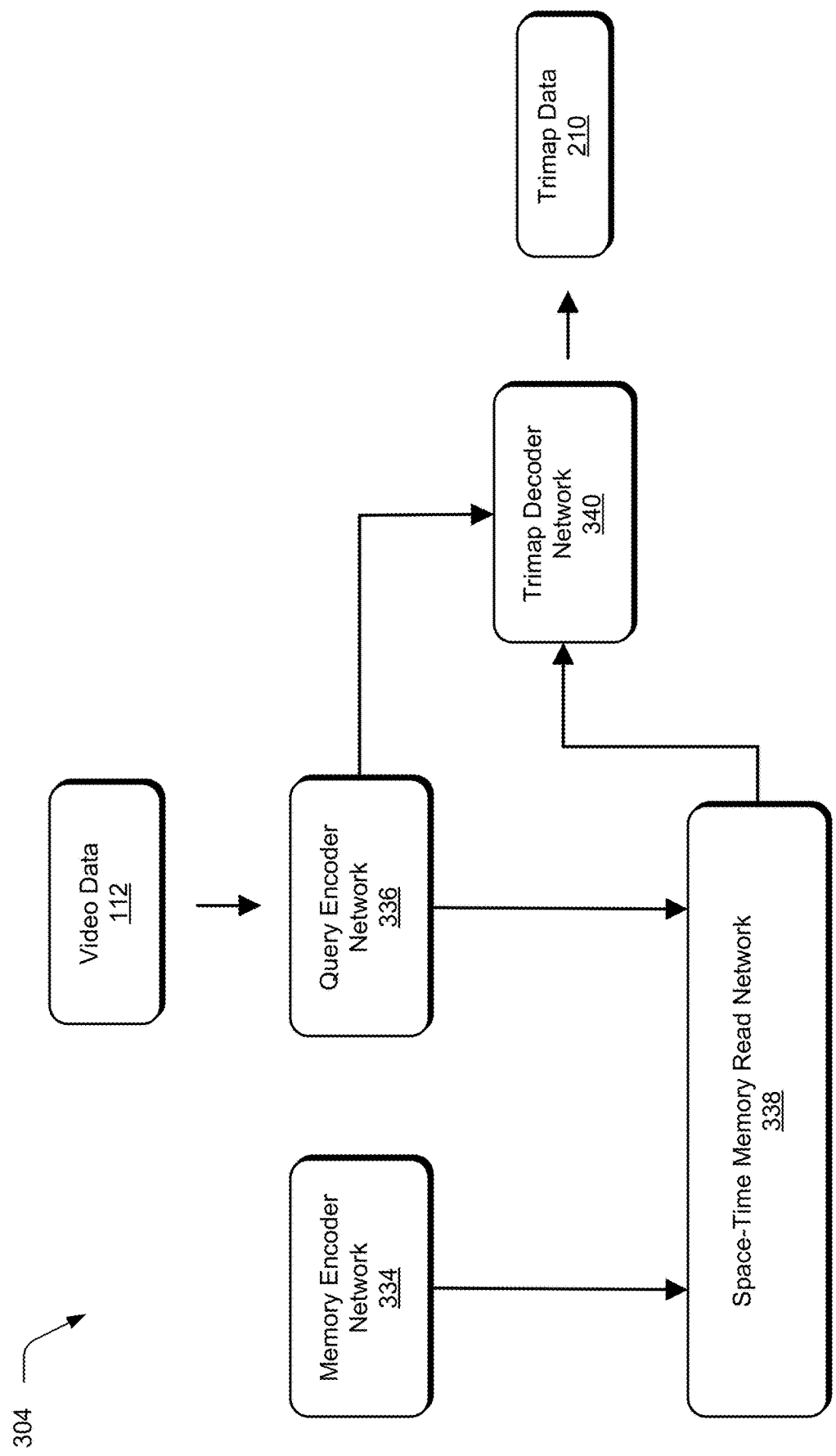

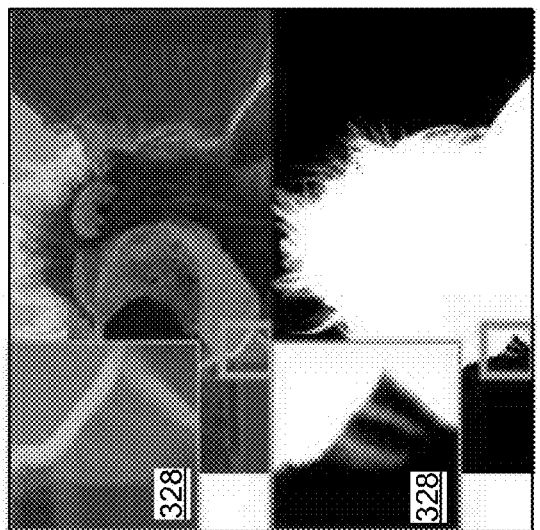
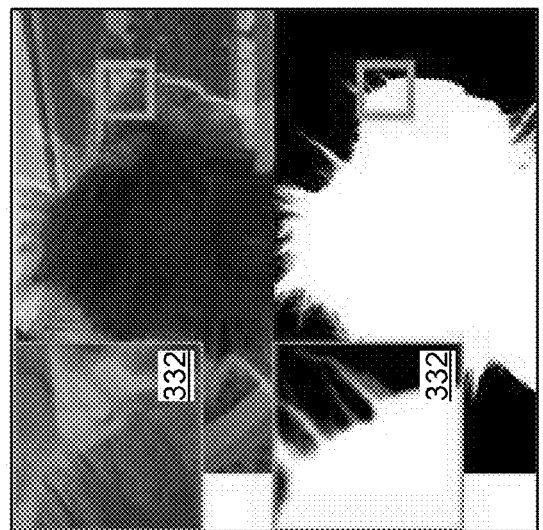
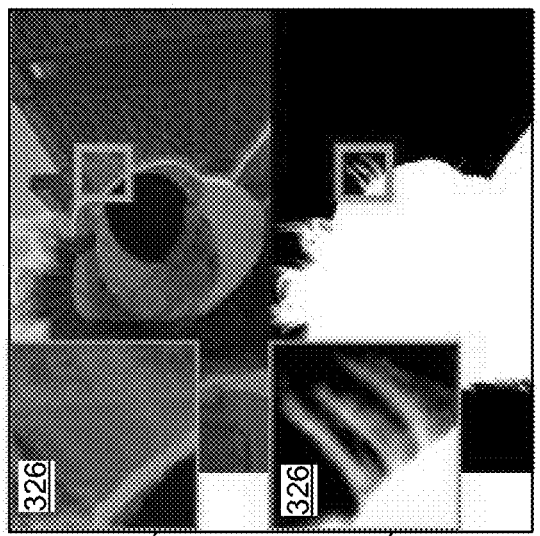
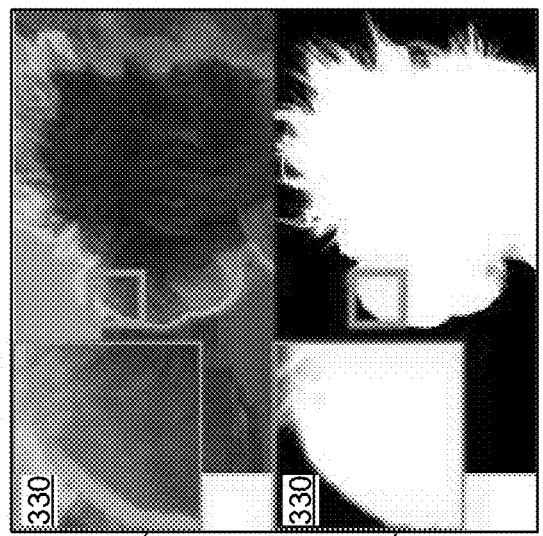
Fig. 37

400

402
Predict a trimap for a frame of a digital video using a first stage of a machine learning model

404
Estimate an alpha matte for the frame based on the trimap and the frame using a second stage of the machine learning model

406
Generate a refined trimap and a refined alpha matte for the frame based on the alpha matte, the trimap, and the frame using a third stage of the machine learning model

408
Estimate an additional trimap for an additional frame of the digital video based on the refined trimap and the refined alpha matte using the first stage of the machine learning model

JOINT TRIMAP ESTIMATION AND ALPHA MATTE PREDICTION FOR VIDEO MATTING

BACKGROUND

Video matting is a technique for predicting alpha mattes for frames of a digital video that separate the frames into a foreground layer and a background layer. This is an essential step for digital video editing applications which depend on accurate separation of foreground and background layers such as video composition. In order to predict alpha mattes, video matting systems leverage trimaps as inputs. A trimap for a frame of a digital video indicates pixels of the frame that are definitively included a foreground, pixels of the frame that are definitively included in a background, and pixels of the frame that are uncertain (e.g., pixels that could be included in the foreground or the background). The uncertain pixels define an unknown region of the trimap and the video matting systems predict an alpha matte for the frame by including pixels in the unknown region in either the foreground layer or the background layer.

Conventional systems for video matting decouple the task into a first stage of trimap propagation and a second stage of alpha matting. In the first stage, reference trimaps are propagated throughout frames of a digital video based on visual correspondences. In the second stage, the propagated trimaps are taken as an input for predicting alpha mattes. However, unknown regions of trimaps (the uncertain pixels) change from frame to frame of the digital video.

For example, a trimap for a first frame includes an unknown region around a boundary of a foreground object. In a second frame, the foreground object is rotated such that visual features depicted by pixels in the unknown region of the trimap are now definitively included in the foreground object but the visual features are still included in an unknown region of a trimap for the second frame that is propagated from the first frame using visual correspondences. Because the unknown regions change from frame to frame, propagating the trimaps based on the visual correspondences as in conventional systems can produce inaccurate trimaps in the first stage. These inaccurate trimaps accumulate and cause failure of alpha matte prediction in the second stage which is a shortcoming of conventional systems.

SUMMARY

Techniques and systems are described for joint trimap estimation and alpha matte prediction for video matting. In an example, a computing device implements a matting system to estimate a trimap for a frame of a digital video using a first stage of a machine learning model. An alpha matte for the frame is predicted based on the trimap and the frame using a second stage of the machine learning model.

The matting system generates a refined trimap and a refined alpha matte based on the alpha matte, the trimap, and the frame using a third stage of the machine learning model. For example, an additional trimap is estimated for an additional frame of the digital video based on the refined trimap and the refined alpha matte using the first stage of the machine learning model. By estimating the additional trimap based on the refined trimap and the refined alpha matte, the described systems are capable accurately predicting alpha mattes for frames of the digital video based on a single ground truth (human annotated) input trimap.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIGS. 3A, 3B, 3C, 3D, 3E, and 3F illustrate an example of joint trimap estimation and alpha matte prediction for video matting.

FIG. 4 is a flow diagram depicting a procedure in an example implementation in which a refined trimap and a refined alpha matte are generated for a frame of a digital video and an additional trimap is estimated for an additional frame of the digital video based on the refined trimap and the refined alpha matte.

DETAILED DESCRIPTION

Overview

Figure 1:
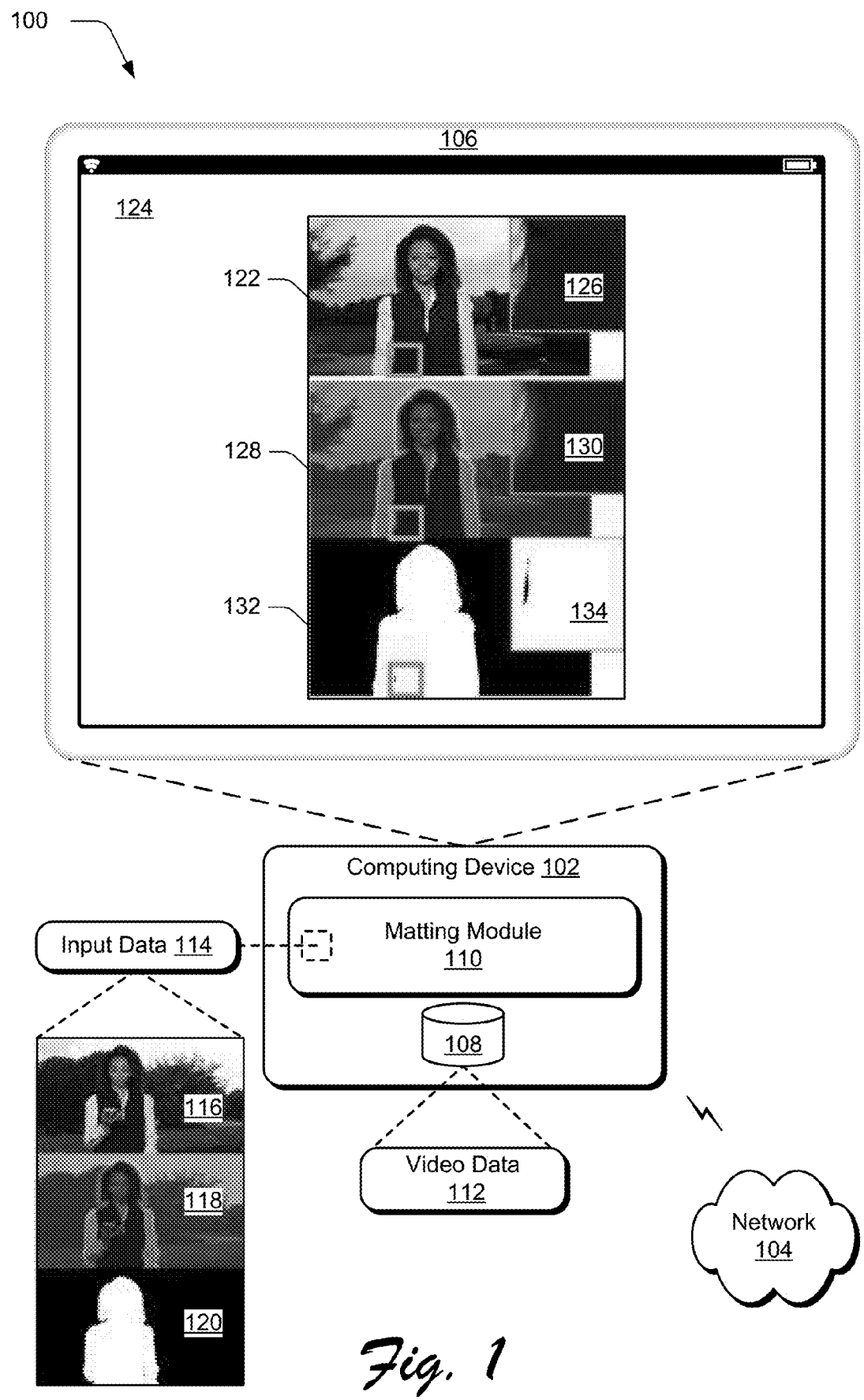
FIG. 1 is an illustration of an environment in an example implementation that is operable to employ digital systems and techniques for joint trimap estimation and alpha matte prediction for video matting as described herein.

Conventional systems for video matting propagate reference trimaps throughout frames of a digital video based on visual correspondences between features depicted in the frames. The propagated trimaps are then used as an input for predicting alpha mattes for the frames of the digital video. However, uncertain regions of trimaps change from frame to frame of the digital video as movements of objects depicted in the frames cause visual features included in an uncertain region of a trimap for a first frame to be definitively included in a foreground or a background of a second frame. Because of this, it is possible to produce inaccurate trimaps by propagating the trimaps based on the visual correspondences. Errors due to these inaccurate trimaps easily accumulate causing failure of alpha matte prediction which is a shortcoming of conventional systems.

In order to overcome the limitations of conventional systems, techniques and systems for joint trimap estimation and alpha matte prediction for video matting are described. In one example, a computing device implements a matting system to estimate a trimap for a frame of a digital video using a first machine learning model. For example, the first machine learning model is a space-time memory network which includes an encoder for embedding memory and an encoder for embedding the frame as a query. The embedded memory and query are used to retrieve a memory value and a decoder of the first machine learning model outputs the trimap for the frame based on the memory value.

The matting system predicts an alpha matte for the frame based on the trimap and the frame using a second machine learning model. In an example, the second machine learning model includes an encoder for embedding the frame and the trimap. The second machine leaning model also includes a decoder which outputs the alpha matte and hidden features (e.g., latent features) based on the embedded frame and the embedded trimap.

For instance, the matting system generates a refined alpha matte for the frame, a refined trimap for the frame, and additional hidden features (e.g., additional latent features) based on the trimap, the alpha matte, the frame, and the hidden features using a third machine learning model. For example, the third machine learning model includes two residual blocks with group normalization and weight standardization. The matting system includes the refined alpha matte, the refined trimap, and the additional hidden features in the memory of the first machine learning model (e.g., the space-time memory network). The matting system estimates an additional trimap for an additional frame of the digital video based on the additional frame, the refined alpha matte, the refined trimap, and the additional hidden features using the first machine learning model.

In some examples, the first machine learning model, the second machine learning model, and the third machine learning model are implemented as a single machine learning model. In these examples, functionality of the first machine learning model is implemented as a first stage of the single machine learning model. Similarly, functionality of the second machine learning model is implemented as a second stage of the single machine learning model and functionality of the third machine learning model is implemented as a third state of the single machine learning model. Continuing the example of the single machine learning model, the matting system estimates the additional trimap for the additional frame of the digital video based on the additional frame, the refined alpha matte, the refined trimap, and the additional hidden features using the first stage of the single machine learning model.

Because the additional hidden features are included in the memory that is embedded by the encoder for embedding memory, any errors are propagated backward at training time, resulting in stable training. This significantly reduces errors caused by uncertain regions of trimaps changing from frame to frame. Because of these improvements, the described systems are capable of accurately predicting alpha mattes for frames of a digital video based on a single user annotated (ground truth) trimap (e.g., for a first frame of the frames). Moreover, since the described systems jointly estimate trimaps and predict alpha mattes unlike conventional systems that decouple these tasks, the described systems are capable of predicting alpha mattes with greater accuracy than the conventional systems. This is demonstrated by an objective comparison between the described systems and the conventional decoupled systems in which the described systems outperform the conventional systems based on multiple different metrics.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a matting module 110.

The storage device 108 is illustrated to include video data 112 that describes frames of digital videos. In one example, the video data 112 describes raw or unedited frames of digital videos such as digital video frames captured by an image capture device of the computing device 102 and/or the display device 106. For example, the video data 112 describes frames of digital videos for video matting.

Video matting is a technique for separating frames of a digital video into layers and predicting alpha mattes that are usable as masks (e.g., binary masks) for the layers, to determine blending of the layers, and so forth. For each frame of the digital video, video matting aims to divide an input color into three components (1) foreground color; (2) background color; and (3) an alpha matte. Accordingly, video matting is a prerequisite for video editing applications which depend on an accurate separation of foreground layers and background layers such as video composition.

The matting module 110 is illustrated as having, receiving, and/or transmitting input data 114. For example, the input data 114 describes a single user annotated trimap for a frame of a digital video described by the video data 112. Trimaps are leveraged as an additional input for video matting and each trimap indicates pixels of a frame of a digital video that are definitively included in a foreground, pixels of the frame that are definitively included in a background, and pixels of the frame that are uncertain (e.g., pixels of the frame that could be included in the foreground or the background). In the illustrated example, the input data 114 describes a frame 116 of a digital video. As shown, the frame 116 depicts a woman looking down at a smartphone in the woman's right hand and the woman is standing in front of some trees which are depicted in a background of the frame 116.

For example, the input data 114 describes a trimap 118 for the frame 116 of the digital video. The trimap 118 is human annotated such that the trimap 118 is a ground truth trimap. For instance, a user interacts with an input device (e.g., a mouse, a stylus, a touch screen, a keyboard, etc.) relative to the frame 116 to indicate background pixels of the frame 116

(e.g., by coloring the background pixels red), foreground pixels of the frame 116 (e.g., by coloring the foreground pixels blue), and uncertain pixels of the frame 116 (e.g., by coloring the uncertain pixels green) in order to generate the trimap 118.

As shown, the trimap 118 indicates pixels that are definitively included in a background of the frame 116 which are illustrated to be colored red in the trimap 118. Similarly, the trimap 118 indicates pixels that are definitively included in a foreground of the frame 116 which are illustrated to be colored blue in the trimap 118. Finally, the trimap 118 indicates pixels that are uncertain with respect to being included in the background of the foreground of the frame 116. These uncertain pixels are illustrated to be colored green in the trimap 118.

The input data 114 is also illustrated as describing an alpha matte 120 for the frame 116 of the digital video. In one example, the alpha matte 120 is predicted using the trimap 118. As shown, the uncertain pixels indicated in the trimap 118 have been included in either the foreground or the background of the alpha matte 120. For example, the trimap 118 provides information about a target object (the woman) depicted in the frame 116 and improves stability of alpha prediction to determine the alpha matte 120 for the frame 116. Because the alpha matte 120 includes more information than the trimap 118, the matting module 110 updates the trimap 118 based on the alpha matte 120 in one example which prevents error accumulation in the trimap 118.

Consider an example in which the matting module 110 processes the input data 114 and the video data 112 using a single machine learning model or two or more machine learning models for joint trimap estimation and alpha matte prediction with respect to an additional frame 122 of the digital video described by the video data 112. The additional frame 122 is displayed in a user interface 124 of the display device 106 and depicts the woman that is depicted in the frame 116. In the additional frame 122, the woman is depicted as looking forward with both arms at the woman's sides. A gap between the woman's right arm and the woman's body is illustrated in a zoomed region 126 of the additional frame 122.

Continuing the previous example, the matting module 110 processes the additional frame 122 using a first machine learning model of the machine learning models to generate a trimap 128 for the additional frame 122. For example, the first machine learning model is a trimap propagation network that includes an encoder for embedding memory (past frames of the digital video with an object mask for the woman) as a memory embedding and an encoder for embedding the additional frame 122 as a query embedding. The embeddings are passed to a space-time memory read block of the first machine learning model, and a decoder of the first machine learning model generates the trimap 128.

As shown, the trimap 128 depicts red pixels that are definitively included in a background of the additional frame 122, blue pixels that are definitively included in a foreground of the additional frame 122, and green pixels which are uncertain (e.g., not definitively included in the background or the foreground). The gap between the woman's right arm and right side illustrated in the zoomed region 126 is also shown in a zoomed region 130 of the trimap 128 as including green colored pixels because these pixels are uncertain with respect to being included in the foreground or the background of the additional frame 122. For example, the matting module 110 processes the additional frame 122 and the trimap 128 using a second machine learning model to generate an alpha matte 132 for the additional frame 122.

In this example, the matting module 110 encodes the additional frame 122 and the trimap 128 as pyramidal features using an alpha encoder of the second machine learning model and uses an alpha decoder with a pyramid pooling module of the second machine learning model to generate the alpha matte 132 for the additional frame 122.

The gap between the woman's right arm and the woman's right side is shown in a zoomed region 134 of the alpha matte 132. By jointly estimating the trimap 128 and predicting the alpha matte 132 using first and second machine learning models, the matting module 110 is capable of predicting alpha mattes which accurately segment foregrounds and backgrounds of digital video frames with a single user annotated trimap. In some examples, the trimap 128 is a refined trimap and the alpha matte 132 is a refined alpha matte generated using a third machine learning model.

For example, the matting module 110 implements the third machine learning model to receive a trimap generated using the first machine learning model and an alpha matte generated using the second machine learning model as inputs, and the third machine learning model generates a refined trimap 128 and a refined alpha matte 132 as an output. In an example, the third machine learning model also receives hidden features or latent features generated by the second machine learning model and the third machine learning model generates the refined trimap 128 and the refined alpha matte 132 based on the hidden features or latent features generated by the second machine learning model. In this example, the matting module 110 uses the refined trimap 128, the refined alpha matte 132, and additional hidden features or additional latent features generated by the third machine learning model to estimate a trimap for a next frame of the digital video using the first machine learning model.

In one example, the matting module 110 implements functionality of the first machine learning model, the second machine learning model, and the third machine learning model as a single machine learning model. For example, the matting module 110 implements functionality of the first machine learning model as a first stage of the single machine learning model. Similarly, the matting module 110 implements functionality of the second machine learning model as a second stage of the single machine learning model, and the matting module 110 implements functionality of the third machine learning model as a third state of the single machine learning model. Continuing the example of the single machine learning model, the matting module 110 uses the refined trimap 128, the refined alpha matte 132, and additional hidden features or additional latent features generated by the third stage of the single machine learning model to estimate a trimap for a next frame of the digital video using the first stage of the single machine learning model.

By using the additional hidden features or additional latent features in this way, any errors are easily propagated backwards at training time resulting in stable training such that the first, second, and third machine learning models (e.g., the first, second, and third stages of the single machine learning model) are trainable end-to-end. For instance, by jointly estimating trimaps and predicting alpha mattes in this way, the matting module 110 is capable of generating alpha mattes with greater accuracy than conventional systems that decouple trimap estimation/propagation and alpha matte prediction. Because of these improvements, the described systems are capable of accurately predicting alpha mattes for frames of a digital video based on a single user annotated (ground truth) trimap.

Figure 2:
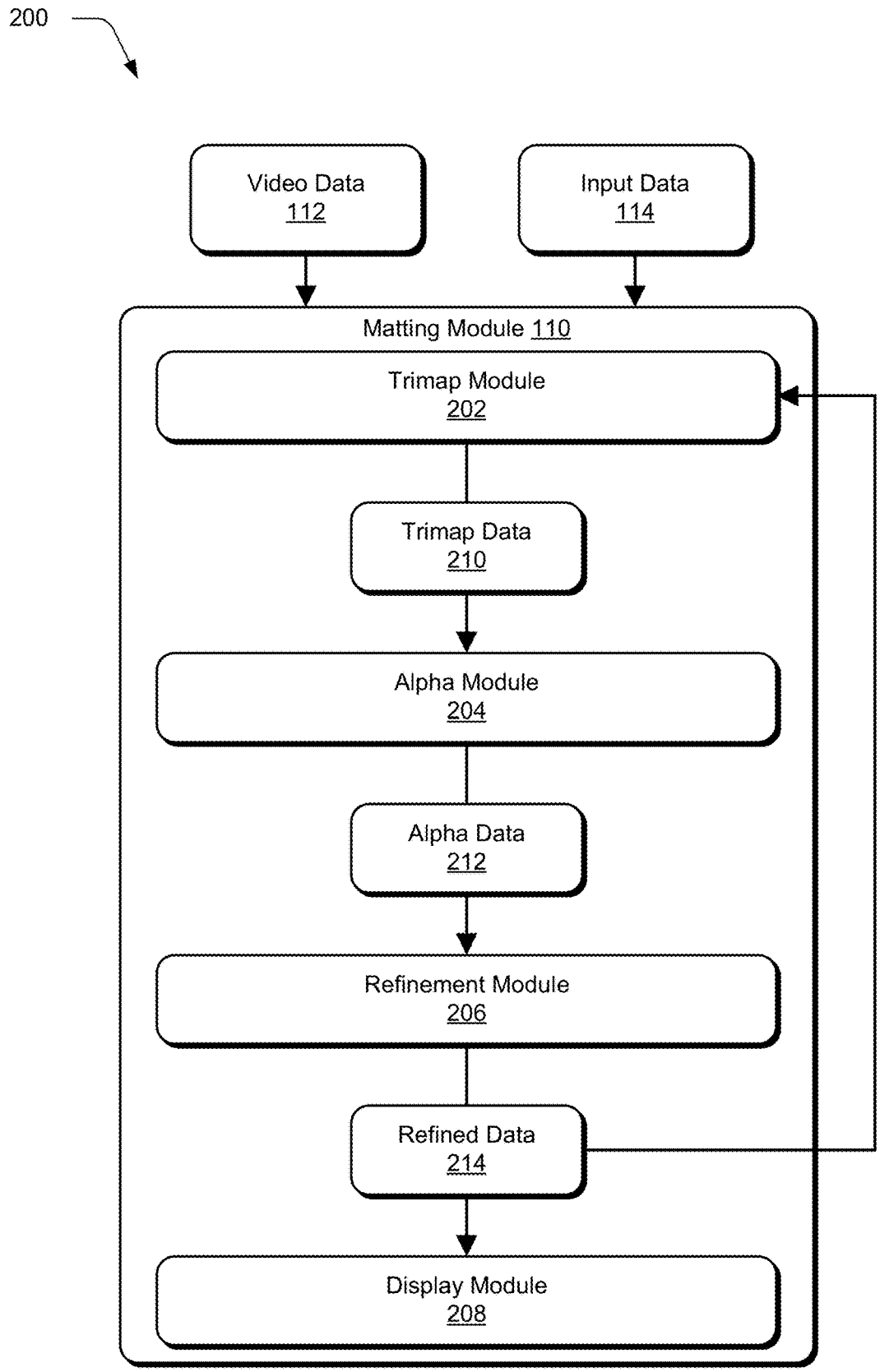
FIG. 2 depicts a system in an example implementation showing operation of a matting module for joint trimap estimation and alpha matte prediction for video matting.

FIG. 2 depicts a system 200 in an example implementation showing operation of a matting module 110. The matting module 110 is illustrated to include a trimap module 202, an alpha module 204, a refinement module 206, and a display module 208. The matting module receives the video data 112 describing frames of a digital video and the input data 114 describing a single annotated trimap for a frame of the digital video as inputs. For example, the trimap module 202 receives the video data 112 and the input data 114 and the trimap module 202 processes the video data 112 and/or the input data 114 to generate trimap data 210.

Figure 3D:
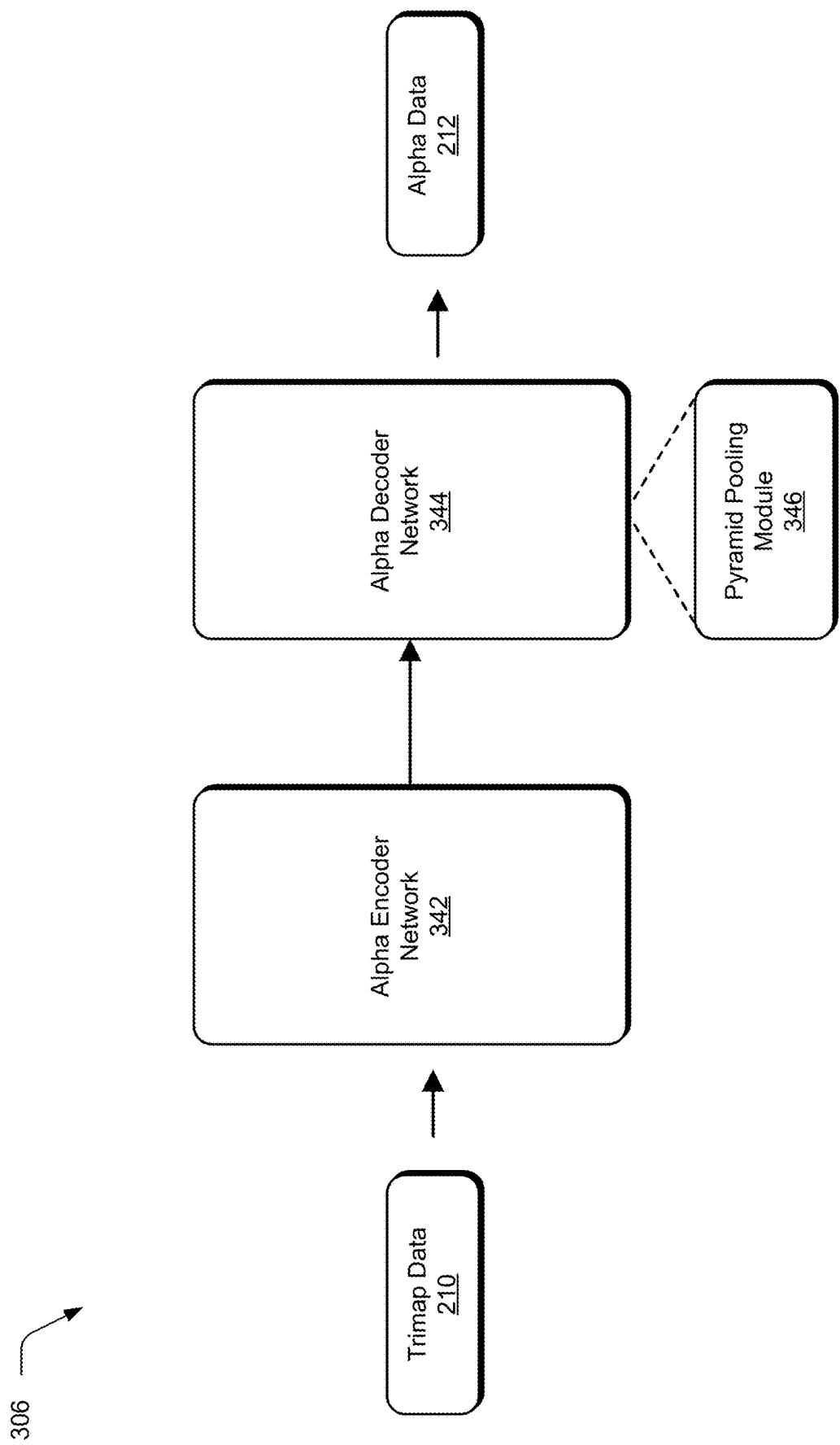
Figure 3E:
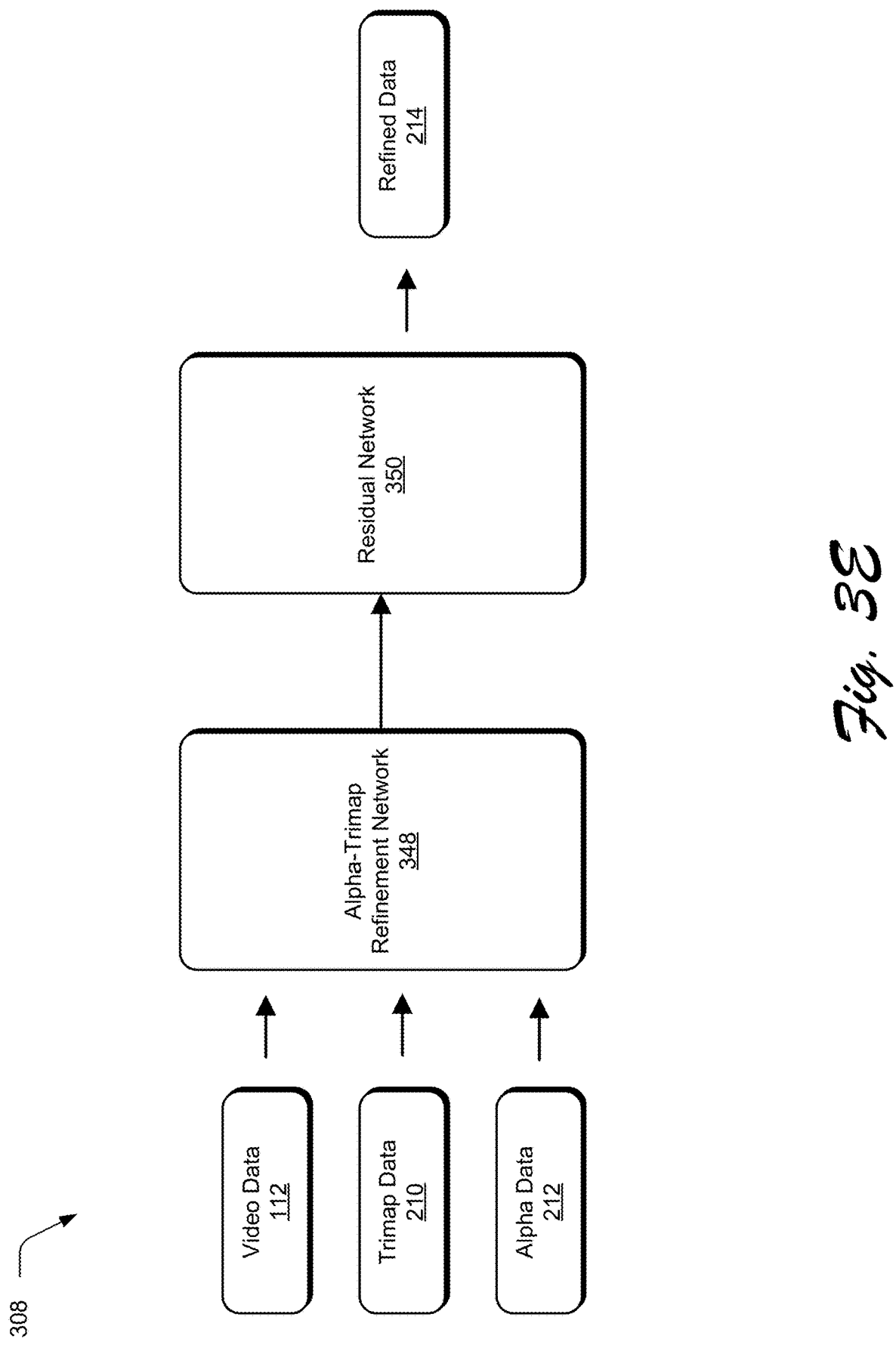

FIGS. 3A, 3B, 3C, 3D, 3E, and 3F illustrate an example of joint trimap estimation and alpha matte prediction for video matting. FIG. 3A illustrates a representation 300 of a single user annotated trimap for a frame of a digital video. FIG. 3B illustrates a representation 302 of frames of the digital video. FIG. 3C illustrates a representation 304 of a first machine learning model and/or a representation 304 of a first stage of a single machine learning model. FIG. 3D illustrates a representation 306 of a second machine learning model and/or a representation 306 of a second stage of the single machine learning model. FIG. 3E illustrates a representation of 308 of a third machine learning model and/or a representation 308 of a third stage of the single machine learning model. FIG. 3F illustrates a representation 310 of a trimap estimated and an alpha matte predicted for each of the frames of the digital video.

With reference to FIG. 2 and FIG. 3A, the trimap module 202 receives the video data 112 and the input data 114. The video data 112 describes frames of a digital video including frame 312 of the digital video. As shown, the frame 312 depicts a side view of a stuffed lion character which is disposed outside in a courtyard in front of some buildings. The stuffed lion character depicted in the frame 312 includes a mane which is blowing in the wind in the courtyard.

The input data 114 describes a single human annotated trimap 314 for the frame 312. For example, a user interacts with an input device (e.g., a mouse, a keyboard, a stylus, a touchscreen, etc.) relative to a user interface such as the user interface 124 to generate the single annotated trimap 314 by coloring pixels of the frame 312 which are definitively included in a foreground blue. In this example, the user interacts with the input device to color pixels of the frame 312 which are definitively included in a background red. The user completes the single annotated trimap 314 by coloring uncertain pixels of the frame 312 green. The uncertain pixels surround a boundary of the stuffed lion character, and these pixels could be included in the background, the foreground, or a mix of the background and the foreground of the frame 312.

Given the frame 312 and the annotated trimap 314 it is possible to accurately predict an alpha matte 316 for the frame 312. As illustrated in the representation 300, the alpha matte 316 includes more information about the frame 312 than the annotated trimap 314 because the uncertain pixels that are colored green in the trimap 314 are included in a foreground, a background, or a mix of the foreground and the background in the alpha matte 316. The uncertain pixels included in the mix of the foreground and the background include a blend of a foreground color and a background color. For example, if an artificial hair of the stuffed lion character that is included in the foreground covers 40 percent of a particular pixel included in the mix the foreground and the background, then a color of the particular pixel is a blend of 40 percent foreground color and 60 percent background color. In this example, the alpha value would be 0.4 (e.g., where 0.0 is background and 1.0 is foreground). In some examples in which the trimap 314 is estimated instead of annotated by the user, the trimap module 202 uses the alpha matte 316 or a refined version of the alpha matte 316 to improve an accuracy of the trimap 314 or a refined version of the trimap 314.

The video data 112 also describes frames 318-324 of the digital video which are included in the representation 302 illustrated in FIG. 3B. As shown, frame 318 depicts a front view of the stuffed lion character from a left side of the character. A portion of the stuffed lion character's black nose is illustrated in a zoomed portion 326 of the frame 318. Frame 320 depicts a front view of the stuffed lion character from a right side and a portion of the stuffed lion character's chin is illustrated in a zoomed region 328 of the frame 320. Frame 322 depicts a side view of the stuffed lion character and a portion of the character's mane is illustrated in a zoomed region 330 of the frame 322. Frame 324 depicts a rear view of the stuffed lion character. A portion of the stuffed lion character's mane and nose is illustrated in a zoomed region 332 of the frame 324.

The trimap module 202 receives the video data 112 describing the frames 318-324 and the input data 114 describing the trimap 314 and processes the video data 112 using a first machine learning model. As used herein, the term "machine learning model" refers to a computer representation that is tunable (e.g., trainable) based on inputs to approximate unknown functions. By way of example, the term "machine learning model" includes a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, reinforcement learning, and/or transfer learning. For example, the machine learning model is capable of including, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

As shown in the representation 304, the first machine learning model includes a memory encoder network 334, a query encoder network 336, a space-time memory read network 338, and a trimap decoder network 340. In one example, the first machine learning model is a modified version of a space-time memory network as described by Seoung Wug Oh et al., *Video Object Segmentation Using Space-Time Memory Networks*, arXiv:1904.00607v2 [cs.CV](12 Aug. 2019). For instance, the memory encoder network 334 and the query encoder network 336 each include an independent ResNet50 encoder with a last layer (res5) omitted to extract fine-scale features. The memory encoder network 334 extracts memory features of a memory and the query encoder network 336 extracts query features from the frames 318-324. The extracted memory features and the extracted query features are embedded into keys and values via four independent 3×3 convolutional layers of the space-time memory read network 338.

Using a memory key and a query key, similarity is computed via non-local matching. A memory value is retrieved based on the computed similarity. The retrieved memory value and a query value are concatenated along the channel dimension in the space-time memory read network 338 and the concatenated result is passed to the trimap decoder network 340 which includes a decoder. In the trimap decoder network 340 several residual blocks and upsampling blocks are utilized and a propagated trimap is output from the trimap decoder network 340.

For example, the trimap module 202 generates the trimap data 210 as describing the frames 318-324 and a trimap for each of the frames 318-324. The alpha module 204 receives and processes the trimap data 210 to generate alpha data 212. For example, the alpha module 204 includes a second machine learning model which is illustrated in the representation 306 of FIG. 3D. The second machine learning model includes an alpha encoder network 342 and an alpha decoder network 344. The alpha decoder network 344 is illustrated to include a pyramid pooling module 346.

For example, the second machine learning model is a network as described by Marco Forte et al., *F, B, Alpha Matting*, arXiv:2003.07711v1 [cs.CV](17 Mar. 2020). The alpha encoder network 342 includes a ResNet50 encoder with group normalization and weight standardization. For instance, the alpha encoder network 342 receives the trimap data 210 describing the frames 318-324 and the trimap for each of the frames 318-324 as an input. The three channels of the trimaps are encoded into eight channels: one channel for softmax probability of a foreground mask, one channel for softmax probability of a background mask, and six channels for three different scales of Gaussian blurs of the foreground and background masks. In the encoder structure, striding in the last two layers (res4 and res5) is removed and dilations of 2 and 4 are included, respectively.

The alpha decoder network 344 receives resulting pyramidal features from the alpha encoder network 342 and the alpha decoder network 344 implements the pyramid pooling module 346 to increase a receptive field of the fine-scale feature. Next, several convolutional layers, leaky ReLU (with a negative slope of 0.01), and bilinear upsampling are followed. The alpha decoder network 344 outputs one channel of the alpha matte for each of the frames 318-324, three channels of a foreground RGB for each of the frames 318-324, three channels of a background RGB for each of the frames 318-324, and 64 channels of hidden features (e.g., latent features) for each of the frames 318-324.

The alpha module 204 generates the alpha data 212 as describing the output from the alpha decoder network 344 including the alpha matte for each of the frames 318-324. The alpha module 204 also generates the alpha data 212 as describing each of the frames 318-324 and the trimap for each of the frames 318-324. The refinement module 206 receives and processes the alpha data 212 to generate refined data 214. For example, the refinement module 206 includes a third machine learning model which is illustrated in the representation 308.

The third machine learning model includes an alpha-trimap refinement network 348 and a residual network 350. Both the alpha-trimap refinement network 348 and the residual network 350 include a light-weight residual block with group normalization and weight standardization. The alpha-trimap refinement network 348 receives an RGB frame of the frames 318-324, a trimap, a predicted alpha matte, and the hidden features output by the alpha decoder network 344 as an input, and the third machine learning model outputs one channel of a refined alpha matte, three channels of the trimap, three channels of a foreground RGB, three channels of a background RGB, and 16 channels of hidden features (e.g., latent features). The refinement module 206 generates the refined data 214 as describing the output of the third machine learning model.

The display module 208 receives the refined data 214 and the trimap module 202 also receives the refined data 214. For instance, the display module 208 processes the refined data 214 to render (e.g., for display in the user interface 124) a trimap 352 for the frame 318 and an alpha matte 354 for the frame 318. As shown in FIG. 3F, the trimap 352 includes uncertain pixels in the zoomed region which are colored green and the alpha matte 354 includes the uncertain pixels in either a foreground or a background of the frame 318. The trimap 352 includes additional uncertain pixels around a boundary of the stuffed lion character and the alpha matte 345 includes the additional uncertain pixels in either the foreground or the background of the frame 318.

The display module 208 also renders a trimap 356 for the frame 320 and an alpha matte 358 for the frame 320. The trimap 356 includes uncertain pixels that are colored green in the zoomed region 328 of the frame 320 and around the boundary of the stuffed lion character. These uncertain pixels are included in either a foreground (e.g., part of the stuffed lion character) or a background of the frame in the alpha matte 358.

For example, the display module 208 renders a trimap 360 for the frame 322 and an alpha matte 362 for the frame 322. Similar to the trimaps 352, 356, the trimap 360 includes uncertain pixels in the zoomed region 330 and around the boundary of the stuffed lion character. In the alpha matte 362, the uncertain pixels are included in either a foreground or a background of the frame 322. For instance, most of the uncertain pixels that are colored green in the zoomed region 330 are included in the foreground of the frame 322 in the alpha matte 362.

The display module 208 additionally renders a trimap 364 for the frame 324 and an alpha matte 366 for the frame 324. The trimap 364 includes uncertain pixels in the zoomed region 332 and around the boundary of the stuffed lion character and the uncertain pixels are included in a foreground or a background of the frame 324 in the alpha matte 366. For example, most of the uncertain pixels (colored green) included in the zoomed region 332 are included in the background in the alpha matte 366.

As noted above, the trimap module 202 also receives the refined data 214 that describes the output from the third machine learning model. For example, the residual network 350 of the third machine learning model outputs one channel of the refined alpha matte, three channels of the trimap, three channels of the foreground RGB, three channels of the background RGB, and the 16 channels of hidden features (e.g., latent features). The refined alpha matte, the trimap, the RGB frame, and the hidden features are included in the memory encoded by the memory encoder network 334 of the first machine learning model.

For example, unlike a binary mask in which a foreground and a background can be accurately estimated by propagating from past binary masks, it is not possible to accurately estimate a trimap using only propagation based on visual correspondences. This is because uncertain pixels (e.g., unknown regions) are frequently changed by a view of a foreground object and trimap only supervision does not provide a consistent "clue" for estimating these changes as the unknown regions drift between frames. However, by including the refined data 214 in the memory that is encoded by the memory encoder network 334, the first machine learning model learns to generate trimaps more effectively. Moreover, by including the hidden features in the memory that is encoded by the memory encoder network 334, any errors from drifting unknown regions are propagated backward at training time, resulting in stable training. By including the hidden features in the memory that is encoded by the memory encoder network 334, errors occurrences due to drifting unknown regions are significantly reduced.

In order for joint trimap estimation and alpha matte prediction to achieve state-of-the-art performance for video matting, the first machine learning model of the trimap module 202, the second machine learning model of the alpha module 204, and the third machine learning model of the refinement module 206 should be trained end-to-end. However, unavailability of labeled training data makes such training impractical initially. In order to overcome this, the first machine learning model and the second machine learning model are initialized with pretrained weights. Specifically, the pretrained first and second machine learning models both leverage ImageNet. Additionally, the first machine learning model is separately trained on image segmentation datasets and video object segmentation datasets. The second machine learning model is also separately trained on the Adobe Image Matting dataset.

After initialization, the machine learning models are trained in three stages followed by a fourth stage in which the first machine learning model, the second machine learning model, and the third machine learning model are trained end-to-end. In a first stage, the first machine learning model and the second machine learning model are separately trained without connections between the models. Specifically, the second machine learning model is trained using ground truth trimaps and the first machine learning model is trained without taking inputs of an alpha matte and hidden features. In a second stage, the second machine learning model and the third machine learning model are jointly trained while the first machine learning model is frozen. In the second stage, the third machine learning model receives soft and noisy trimaps as inputs and learns to accurately estimate trimaps and accurately predict alpha mattes.

The first machine learning model is trained in a third stage in which input layers for hidden features and alpha mattes are activated. In the third stage, the first machine learning model is trained while parameters for alpha prediction and refinement are frozen. This training leverages loss from the predicted trimap and also losses from alpha prediction. For example, this enables the first machine learning model to estimate a more reliable trimap for predicting an alpha matte. Although the second and third machine learning models are not trained in this third stage, gradients from their losses are leveraged to update the first machine learning model.

In the fourth stage, the first, second, and third machine learning models are trained end-to-end on a video matting dataset. Using the stage-wise pretraining, both image data and video data are leverageable to effectively achieve stable performance improvements during the end-to-end training. Objective functions are set for all outputs of the machine learning models except for the hidden features. For the first frame where the single annotated trimap 314 is provided as an input, loss is only applied to the refined trimap. Ideally, there should be no change after refinement; however, it is observed that penalizing any change after refinement is helpful to prevent corruption of already accurate trimaps.

Although joint trimap estimation and alpha matte prediction for video matting is described in relation to the first, second, and third machine learning models, it is to be appreciated that in some examples the described systems are implemented using a single machine learning model, two machine learning models, four machine learning models, and so forth. For instance, functionality of the first machine learning model is implemented as a first stage of a single machine learning model and functionality of the second machine learning model is implemented as a second stage of the single machine learning model. Functionality of the third machine learning model is implemented as a third stage of the single machine learning model or as part of the first or second stages of the single machine learning model.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which a refined trimap and a refined alpha matte are generated for a frame of a digital video and an additional trimap is estimated for an additional frame of the digital video based on the refined trimap and the refined alpha matte.

A trimap is predicted for a frame of a digital video using a first stage of a machine learning model (block 402). For example, the computing device 102 implements the matting module 110 to predict the trimap for the frame. An alpha matte is estimated for the frame based on the trimap and the frame using a second stage of the machine learning model (block 404). In one example, the matting module 110 estimates the alpha matte for the frame.

A refined trimap and a refined alpha matte are generated for the frame based on the alpha matte, the trimap, and the frame using a third stage of the machine learning model (block 406). In an example, the computing device 102 implements the matting module 110 to generate the refined trimap and the refined alpha matte. An additional trimap is estimated for an additional frame of the digital video based on the refined trimap and the refined alpha matte using the first stage of the machine learning model (block 408). For example, the matting module 110 estimates the additional trimap for the additional frame of the digital video.

Figure 5A:
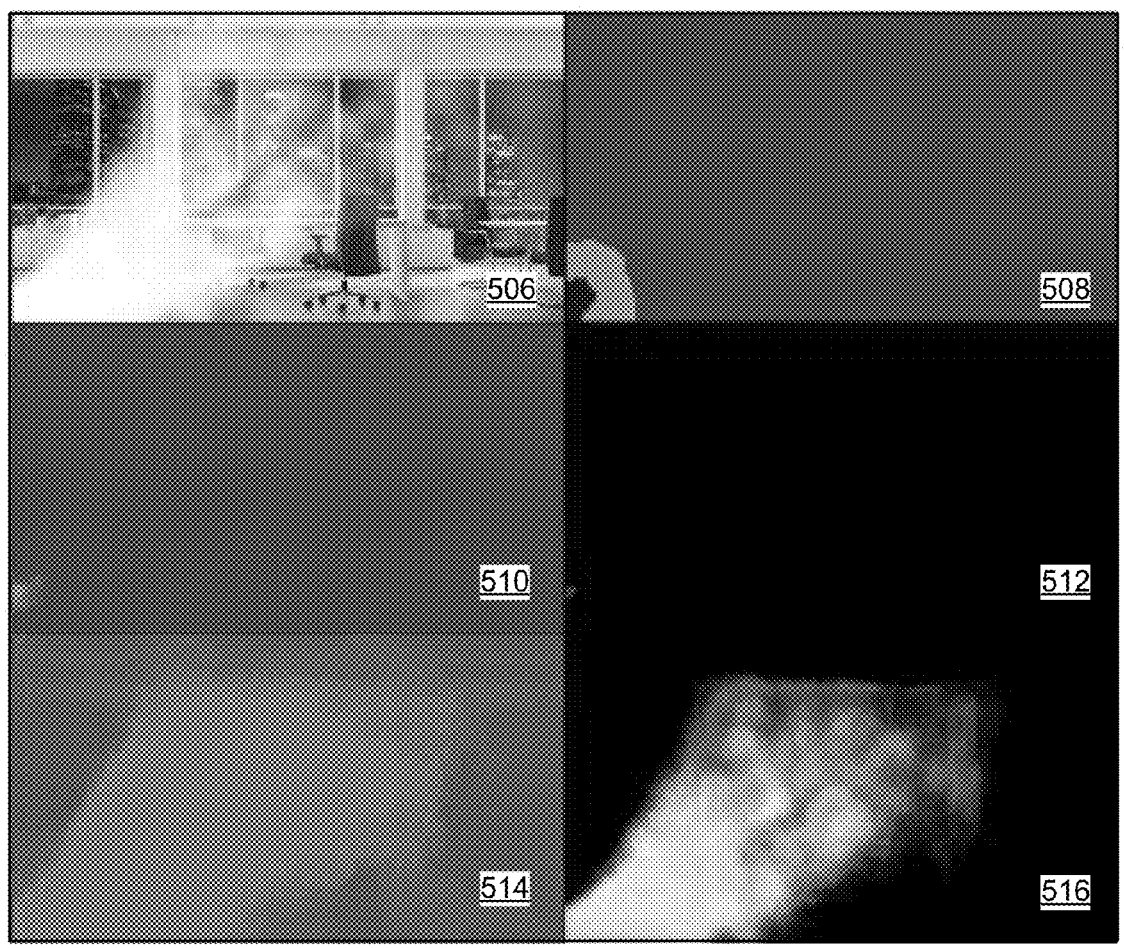
FIGS. 5A, 5B, and 5C illustrate example representations of trimaps estimated using conventional systems and trimaps estimated using the described systems.
Figure 5B:
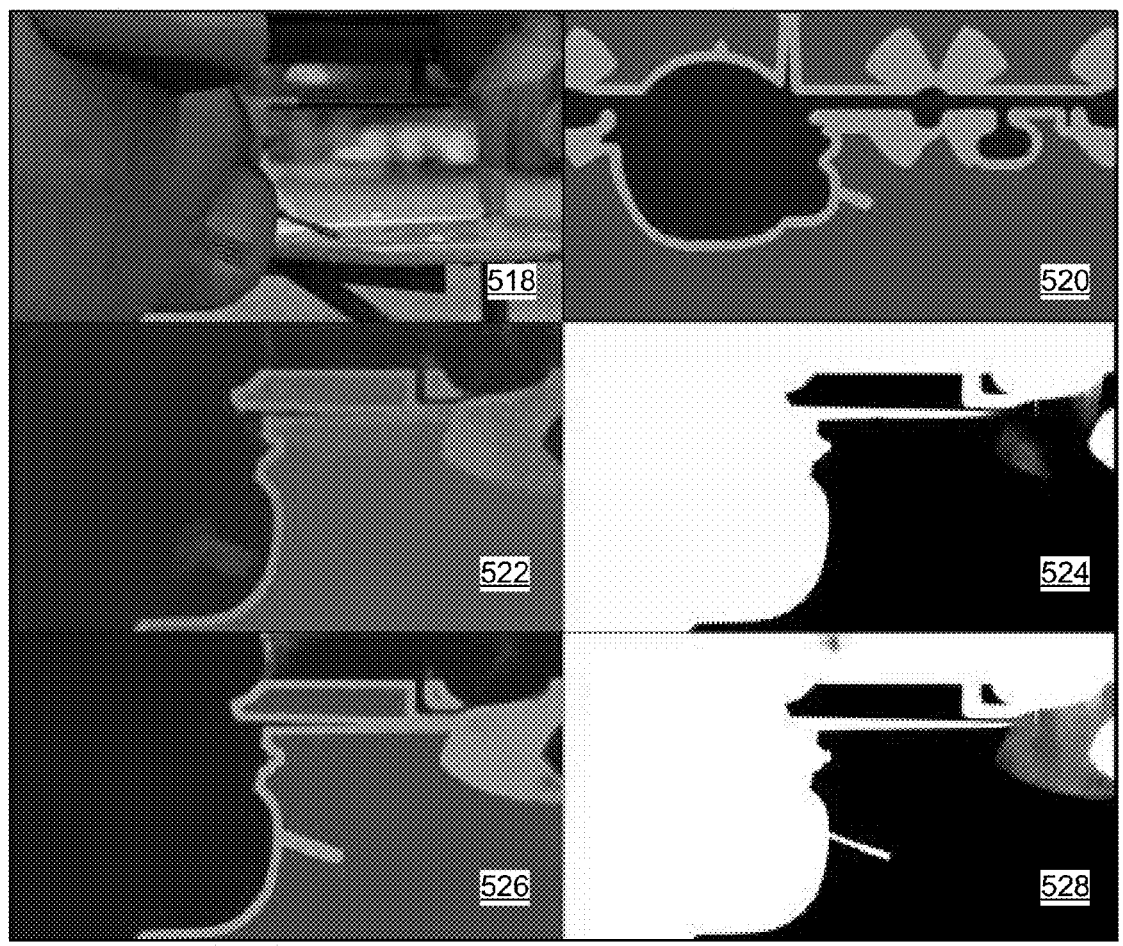
Figure 5C:
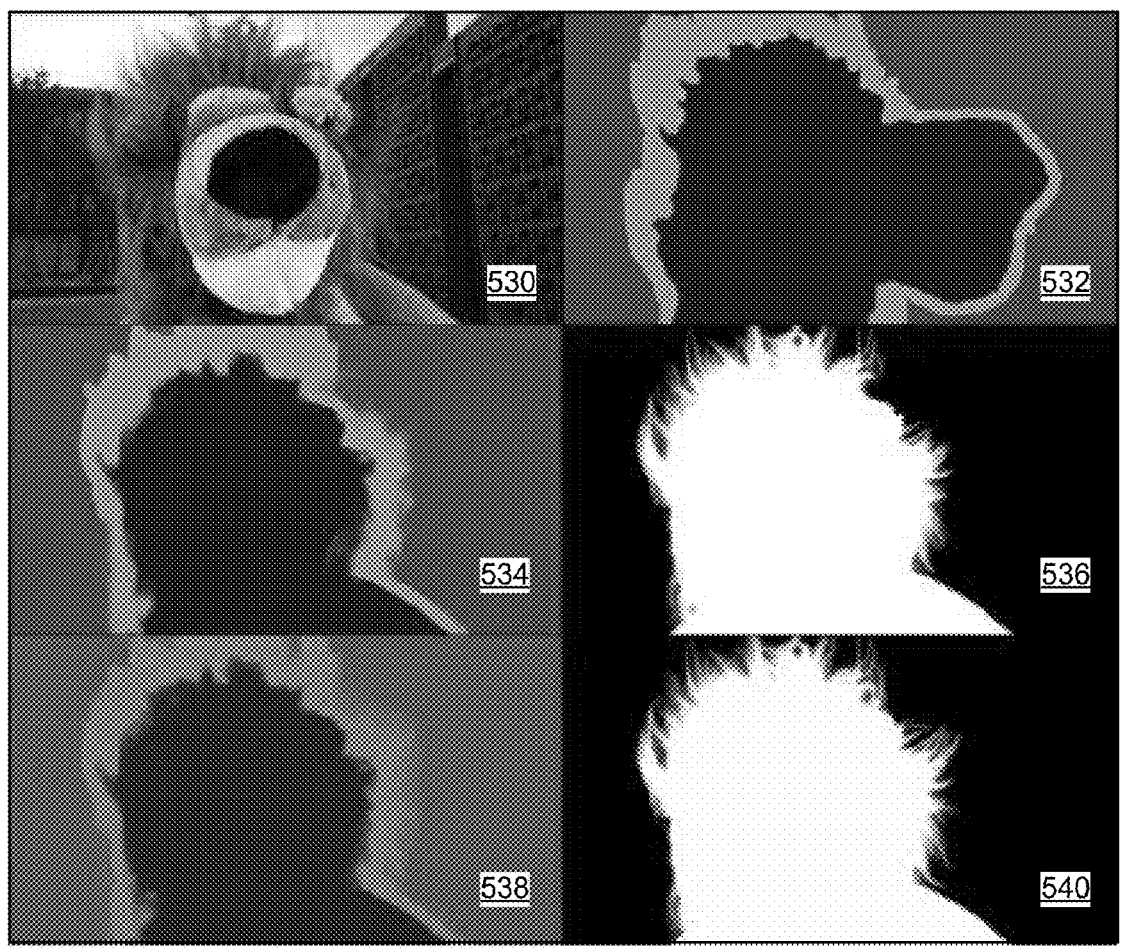

FIGS. 5A, 5B, and 5C illustrate example representations of trimaps estimated using conventional systems and trimaps estimated using the described systems. FIG. 5A illustrates a representation 500 of a first example from the VideoMatting108 dataset. FIG. 5B illustrates a representation 502 of an example from the DVM dataset. FIG. 5C illustrates a representation 504 of a second example from the VideoMatting 108 dataset.

With reference to FIG. 5A, the representation 500 includes a frame 506 of a digital video and a human annotated trimap 508 for a different frame of the digital video. As shown, the frame 506 depicts an office setting in its background and smoke or steam in its foreground. A trimap 510 estimated for the frame 506 based on the annotated trimap 508 and the frame 506 using conventional systems that decouple video matting into a trimap propagation stage and an alpha matting stage does not include any pixels that are definitively foreground pixels. The trimap 510 only includes uncertain pixels for a small portion of the smoke or steam in the foreground of the frame 506 and the uncertain pixels are in region of the trimap 510 that corresponds to foreground pixels in the annotated trimap 508 for the different frame of the digital video. As a result, an alpha matte 512 predicted for the frame 506 using the conventional systems only includes a small portion of the smoke or steam in its foreground and incorrectly includes a majority of the smoke or steam in its background.

A trimap 514 estimated for the frame 506 based on the annotated trimap 508 and the frame 506 using the described systems for joint trimap estimation and alpha matte prediction also does not include any pixels that are definitively foreground pixels. However, the trimap 514 includes uncertain pixels for an entirety of the smoke or steam in the foreground of the frame 506. An alpha matte 516 predicted for the frame 506 using the described systems correctly includes the entirety of the smoke or steam in its foreground and correctly includes only the office setting in its background.

The representation 502 illustrated in FIG. 5B includes a frame 518 of a digital video and a human annotated trimap 520 for a different frame of the digital video. The frame 518 depicts a portion of a moving military plane which is also on a rotating platform such that the plane is moving forward relative to the rotating platform but the plane is also rotating with the rotating platform relative to a background of the frame 518. The portion of the military plane depicted by the frame 518 includes an upper gun and a lower gun below one wing of the military plane and the portion of the plane is a foreground object in the frame 518.

A trimap 522 estimated based on the annotated trimap 520 and the frame 518 using the conventional systems incorrectly includes the lower gun as definitively in the background of the frame 518. Accordingly, an alpha matte 524 predicted using the conventional systems also incorrectly includes the lower gun of military plane in its background. However, a trimap 526 estimated for the frame 518 using the described systems for joint trimap estimation and alpha matte prediction includes uncertain pixels colored green for military plane's lower gun. An alpha matte 528 predicted for the frame 518 using the described systems correctly includes the lower gun of the military plane in its foreground.

With reference to FIG. 5C, the representation 504 includes a frame 530 of a digital video and a human annotated trimap 532 for a different frame of the digital video. As shown, the frame 530 depicts a stuffed lion character with a mane blowing in wind in its foreground with some trees and a fence in its background. The representation 504 includes a trimap 534 estimated for the frame 530 using the conventional systems and an alpha matte 536 predicted for the frame 530 using the conventional systems. The representation 504 also includes a trimap 538 estimated for the frame 530 using the described systems and an alpha matte 540 predicted for the frame 530 using the described systems. By comparing the alpha matte 536 and the alpha matte 540 it is apparent that the alpha matte 536 incorrectly includes some portions of the lion character's mane in its background while the alpha matte 540 correctly includes all portions of the lion character's mane in its foreground.

Example Improvements

Table 1 below presents results of a comparison on the VideoMatting108 validation set with medium trimap between conventional systems that decouple video matting into a trimap propagation stage and an alpha matting stage and the described systems for joint trimap estimation and alpha matte prediction. The evaluation metrics include in Table 1 are average sum of squared difference (SSDA), mean squared error (MSE), mean absolute difference (MAD), mean squared difference of direct temporal gradients (dtSSD), and mean squared difference between the warped temporal gradient (MSDdt).

TABLE 1

| System | SSDA | MSE | MAD | dtSSD | MSDdt |
| --- | --- | --- | --- | --- | --- |
| Conventional Systems | 83.61 | 10.61 | 22.12 | 36.30 | 3.44 |
| Described Systems | 75.36 | 9.40 | 21.00 | 29.63 | 2.73 |

As shown in Table 1 above, the described systems for joint trimap estimation and alpha matte prediction outperform the conventional decoupled systems on all metrics evaluated. Table 2 below presents performance of the described systems at different ones of the four training stages. The first four columns denote each of the training stages and an "X" indicates a corresponding training stage is completed.

TABLE 2

| Training Stages | | | | | | | | |
| --- | --- | --- | --- | --- | --- | --- | --- | --- |
| 1 | 2 | 3 | 4 | SSDA | MSE | MAD | dtSSD | MSDdt |
|   |   |   | X | 87.31 | 11.15 | 23.35 | 33.29 | 3.15 |
| X |   |   | X | 76.54 | 9.68 | 23.09 | 31.63 | 3.14 |
| X | X |   | X | 75.33 | 9.54 | 22.30 | 31.44 | 3.06 |
| X | X | X | X | 54.66 | 2.61 | 13.01 | 29.86 | 1.78 |

As shown in Table 2 above, each pretraining stage consistently improves performance. These results demonstrate that the stage-wise pretraining followed by end-to-end fine-tuning is effective.

Example System and Device

Figure 6:
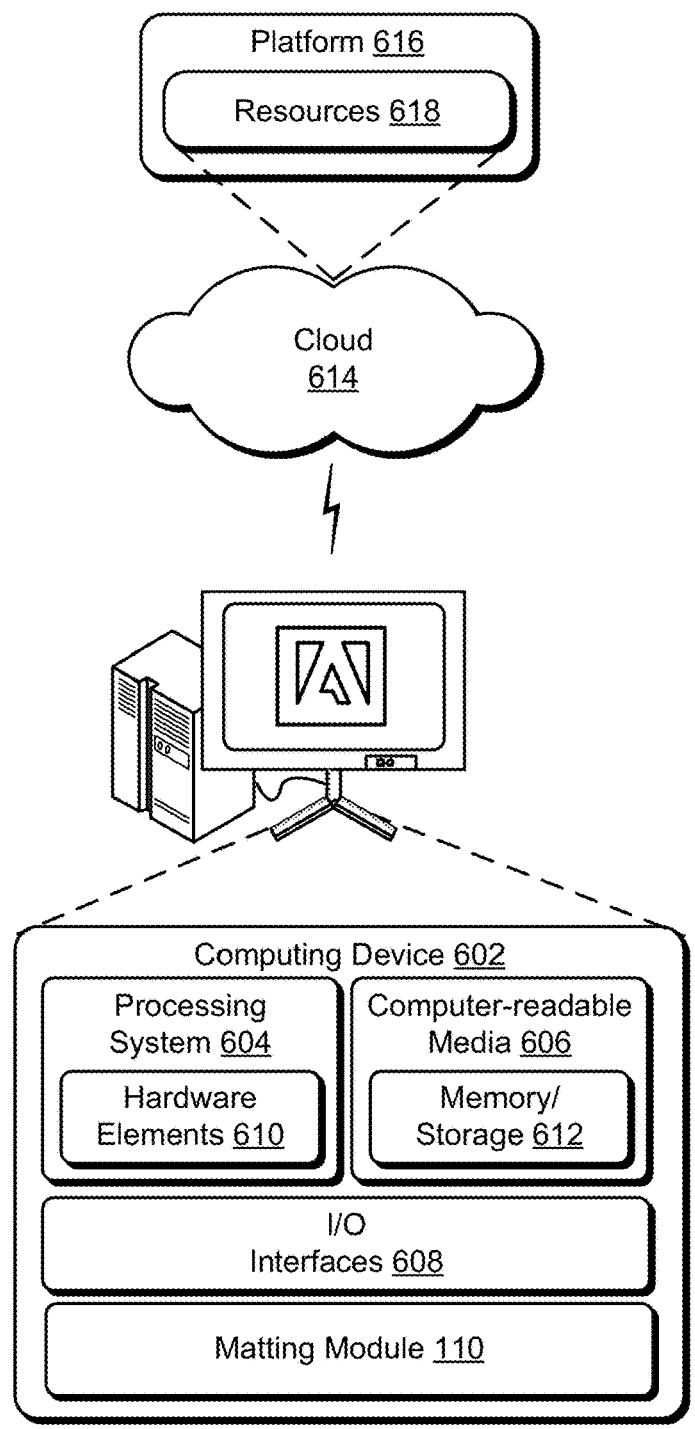
FIG. 6 illustrates an example system that includes an example computing device that is representative of one or more computing systems and/or devices for implementing the various techniques described herein.

FIG. 6 illustrates an example system 600 that includes an example computing device that is representative of one or more computing systems and/or devices that are usable to implement the various techniques described herein. This is illustrated through inclusion of the matting module 110. The computing device 602 includes, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that are configured as processors, functional blocks, and so forth. This includes example implementations in hardware as an application specific integrated circuit or other logic device formed using one or more semiconductors. The hardware elements 610 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 606 is illustrated as including memory/storage 612. The memory/storage 612 represents memory/storage capacity associated with one or more computer-readable media. In one example, the memory/storage 612 includes volatile media (such as random access memory (RAM)) and/or nonvolatile media (such as read only memory (ROM), Flash memory, optical disks, magnetic disks, and so forth). In another example, the memory/storage 612 includes fixed media (e.g., RAM, ROM, a fixed hard drive, and so on) as well as removable media (e.g., Flash memory, a removable hard drive, an optical disc, and so forth). The computer-readable media 606 is configurable in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 610. For example, the computing device 602 is configured to implement particular instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supportable by various configurations of the computing device 602 and are not limited to the specific examples of the techniques described herein. This functionality is also implementable entirely or partially through use of a distributed system, such as over a "cloud" 614 as described below.

The cloud 614 includes and/or is representative of a platform 616 for resources 618. The platform 616 abstracts underlying functionality of hardware (e.g., servers) and software resources of the cloud 614. For example, the resources 618 include applications and/or data that are utilized while computer processing is executed on servers that are remote from the computing device 602. In some examples, the resources 618 also include services provided over the Internet and/or through a subscriber network, such as a cellular or Wi-Fi network.

The platform 616 abstracts the resources 618 and functions to connect the computing device 602 with other computing devices. In some examples, the platform 616 also serves to abstract scaling of resources to provide a corresponding level of scale to encountered demand for the resources that are implemented via the platform. Accordingly, in an interconnected device embodiment, implementation of functionality described herein is distributable throughout the system 600. For example, the functionality is implementable in part on the computing device 602 as well as via the platform 616 that abstracts the functionality of the cloud 614.

CONCLUSION

Although implementations of systems for joint trimap estimation and alpha matte prediction for video matting have been described in language specific to structural features and/or methods, it is to be understood that the appended claims are not necessarily limited to the specific features or methods described. Rather, the specific features and methods are disclosed as example implementations of systems for joint trimap estimation and alpha matte prediction for video matting, and other equivalent features and methods are intended to be within the scope of the appended claims. Further, various different examples are described and it is to be appreciated that each described example is implementable independently or in connection with one or more other described examples.

What is claimed is:

1. In a digital medium environment, a method implemented by a computing device, the method comprising:
   estimating, by the computing device, a trimap for a frame of a digital video using a first stage of a machine learning model;
   predicting, by the computing device, an alpha matte for the frame based on the trimap and the frame using a second stage of the machine learning model;
   generating, by the computing device, a refined trimap and a refined alpha matte for the frame based on the alpha matte, the trimap, and the frame using a third stage of the machine learning model; and
   estimating, by the computing device, an additional trimap for an additional frame of the digital video based on the refined trimap and the refined alpha matte using the first stage of the machine learning model.

2. The method as described in claim 1, further comprising predicting an additional alpha matte for the additional frame based on the additional trimap and the additional frame using the second stage of the machine learning model.

3. The method as described in claim 2, further comprising generating an additional refined trimap and an additional refined alpha matte for the additional frame based on the additional alpha matte, the additional trimap, and the additional frame using the third stage of the machine learning model.

4. The method as described in claim 3, wherein the additional refined trimap and the additional refined alpha matte are generated based on a single user annotated trimap.

5. The method as described in claim 4, wherein the single user annotated trimap is for a subsequent frame of the digital video and the trimap is predicted based on the single user annotated trimap.

6. The method as described in claim 1, wherein the refined trimap and the refined alpha matte are generated based on latent feature data generated by the second stage of the machine learning model.

7. The method as described in claim 1, wherein the trimap is estimated based on latent feature data generated by the third stage of the machine learning model.

8. The method as described in claim 1, wherein the first stage of the machine learning model is separately trained and the second stage of the machine learning model is separately trained before the first stage of the machine learning model, the second stage of the machine learning model, and the third stage of the machine learning model are trained end-to-end.

9. The method as described in claim 1, wherein the second stage of the machine learning model and the third stage of the machine learning model are jointly trained before the first stage of the machine learning model, the second stage of the machine learning model, and the third stage of the machine learning model are trained end-to-end.

10. A system comprising:
    a trimap module implemented at least partially in hardware of a computing device to estimate a trimap for a frame of a digital video using a first machine learning model;
    an alpha module implemented at least partially in the hardware of the computing device to predict an alpha matte for the frame based on the trimap and the frame using a second machine learning model;
    a refinement module implemented at least partially in the hardware of the computing device to:
      generate a refined trimap and a refined alpha matte for the frame based on the alpha matte, the trimap, and the frame using a third machine learning model; and
      transmit data describing the refined trimap and the refined alpha matte to the trimap module for estimating an additional trimap for an additional frame of the digital video.

11. The system as described in claim 10, wherein the trimap module is further implemented to estimate the additional trimap for the additional frame based on the refined trimap, the refined alpha matte, and latent feature data generated by the third machine learning model.

12. The system as described in claim 10, wherein the refined trimap and the refined alpha matte are generated based on latent feature data generated by the second machine learning model.

13. The system as described in claim 10, wherein the refinement module is further implemented to generate an additional refined trimap and an additional refined alpha matte for each frame of the digital video based on a single user annotated trimap.

14. The system as described in claim 10, wherein the second machine learning model and the third machine learning model are jointly trained before the first machine learning model, the second machine learning model, and the third machine learning model are trained end-to-end.

15. The system as described in claim 10, wherein the first machine learning model is separately trained and the second machine learning model is separately trained before the first machine learning model, the second machine learning model, and the third machine learning model are trained end-to-end.

16. One or more computer-readable storage media comprising instructions stored thereon that, responsive to execution by a computing device, causes the computing device to perform operations including:
- receiving input data describing a single user annotated trimap for a frame of a digital video;
- estimating a trimap for a subsequent frame based on the single user annotated trimap using a first stage of a machine learning model;
- predicting an alpha matte for the frame based on the trimap and the frame using a second stage of the machine learning model;
- generating a refined trimap and a refined alpha matte based on the alpha matte, the trimap, and the frame using a third stage of the machine learning model;
- estimating an additional trimap for an additional frame of the digital video based on the refined trimap, the refined alpha matte, and the additional frame using the first stage of the machine learning model; and
- predicting an additional alpha matte for the additional frame based on the additional trimap and the additional frame using the second stage of the machine learning model.

17. The one or more computer-readable storage media as described in claim 16, wherein the refined trimap and the refined alpha matte are generated based on latent feature data generated by the second stage of the machine learning model.

18. The one or more computer-readable storage media as described in claim 16, wherein the trimap is estimated based on latent feature data generated by the third stage of the machine learning model.

19. The one or more computer-readable storage media as described in claim 16, wherein the first stage of the machine learning model is separately trained and the second stage of the machine learning model is separately trained before the first stage of the machine learning model, the second stage of the machine learning model, and the third stage of the machine learning model are trained end-to-end.

20. The one or more computer-readable storage media as described in claim 16, wherein the second stage of the machine learning model and the third stage of the machine learning model are jointly trained before the first stage of the machine learning model, the second stage of the machine learning model, and the third stage of the machine learning model are trained end-to-end.

* * * * *